(12) United States Patent
De Marchi

(10) Patent No.: US 6,644,868 B2
(45) Date of Patent: Nov. 11, 2003

(54) PLUG CONSTRUCTION FOR AN OPTICAL PLUG-AND-SOCKET CONNECTION

(75) Inventor: Silverio De Marchi, Ascona (CH)

(73) Assignee: Diamond SA, Losone (CH)

( * ) Notice: Subject to any disclaimer, the term of this patent is extended or adjusted under 35 U.S.C. 154(b) by 100 days.

(21) Appl. No.: 09/880,099

(22) Filed: Jun. 14, 2001

(65) Prior Publication Data

US 2002/0006253 A1 Jan. 17, 2002

Related U.S. Application Data

(63) Continuation-in-part of application No. 09/174,118, filed on Oct. 19, 1998, now Pat. No. 6,276,839.

(30) Foreign Application Priority Data

Nov. 13, 1997 (EP) .............................................. 97810865
Jun. 15, 2000 (EP) .............................................. 00810519

(51) Int. Cl.⁷ ................................................. G02B 6/36
(52) U.S. Cl. ............................ 385/88; 385/56; 385/70; 385/92
(58) Field of Search .............................. 385/56, 60, 70, 385/76, 78, 92

(56) References Cited

U.S. PATENT DOCUMENTS 4,793,683 A 12/1988 Cannon, Jr. et al.
4,798,440 A 1/1989 Hoffer et al.
4,872,736 A 10/1989 Myers et al.
5,528,711 A 6/1996 Iwano et al.
5,542,015 A 7/1996 Hultermans
5,764,834 A 6/1998 Hultermans
6,422,759 B1 * 7/2002 Kevern ........................ 385/60

FOREIGN PATENT DOCUMENTS

WO      WO 94/24594      10/1994

OTHER PUBLICATIONS

Iwano et al., "MU–type Optical Fiber Connector System", NTT Review, vol. 9 No. 2 Mar. 1997.

* cited by examiner

Primary Examiner—Rodney Bovernick
Assistant Examiner—Sung Pak
(74) Attorney, Agent, or Firm—Shoemaker and Mattare

(57) ABSTRACT

A plug-and-socket connection includes a socket part on a mother board and a plug part on a daughter board. The plug part comprises a plug housing axially displaceably mounted on a daughter board. A securing mechanism latches the socket part in a latched position. The plug housing, in the insertion direction, is directly or indirectly supported on a push element in the form of a leaf spring with an angled part. The spring force of this leaf spring maintains the support until reaching the latching position. With a continued pushing movement, the support is automatically released by yielding of the leaf spring. In this manner the daughter board, after reaching the latching position, may be decoupled from the mother board.

13 Claims, 10 Drawing Sheets

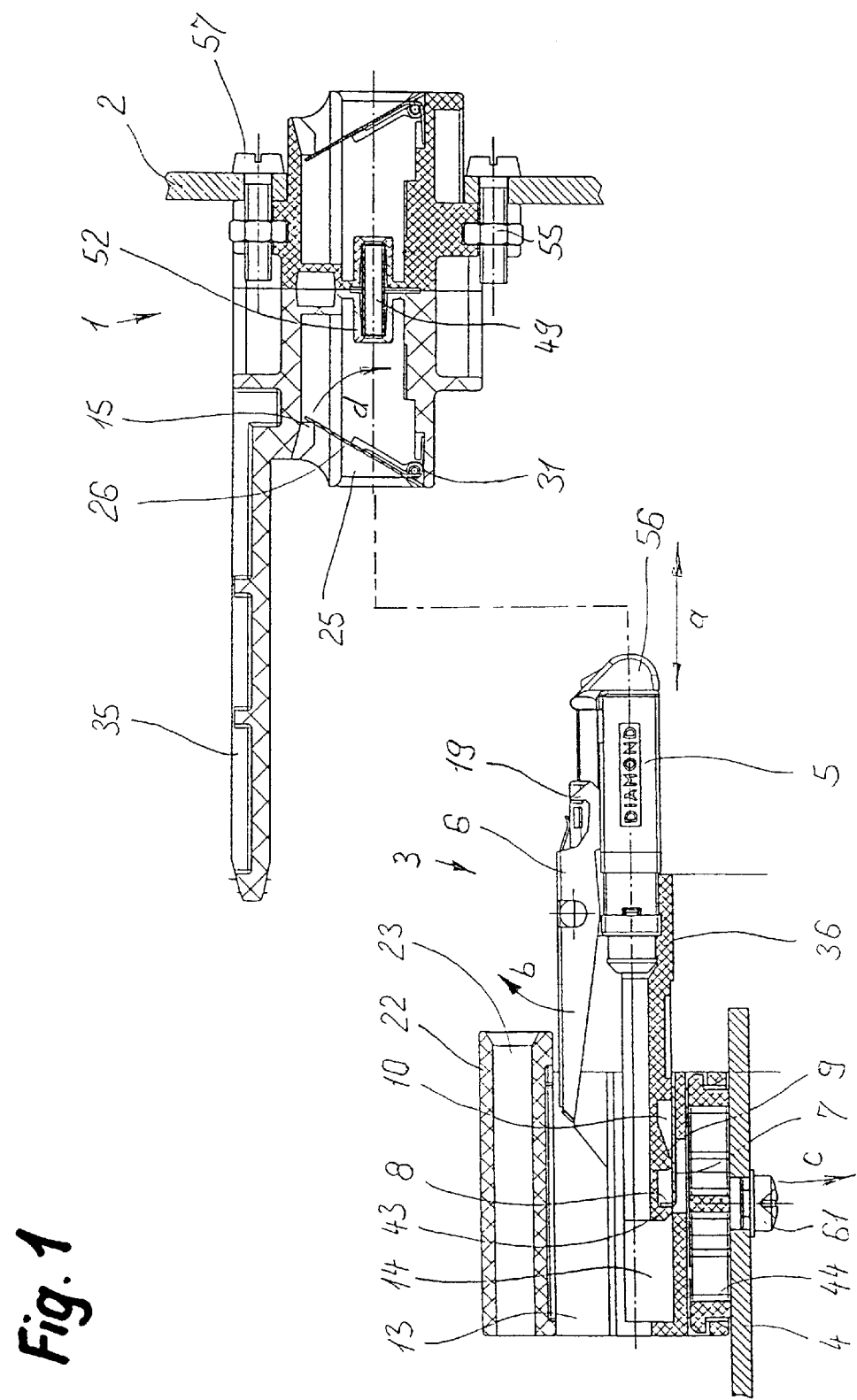

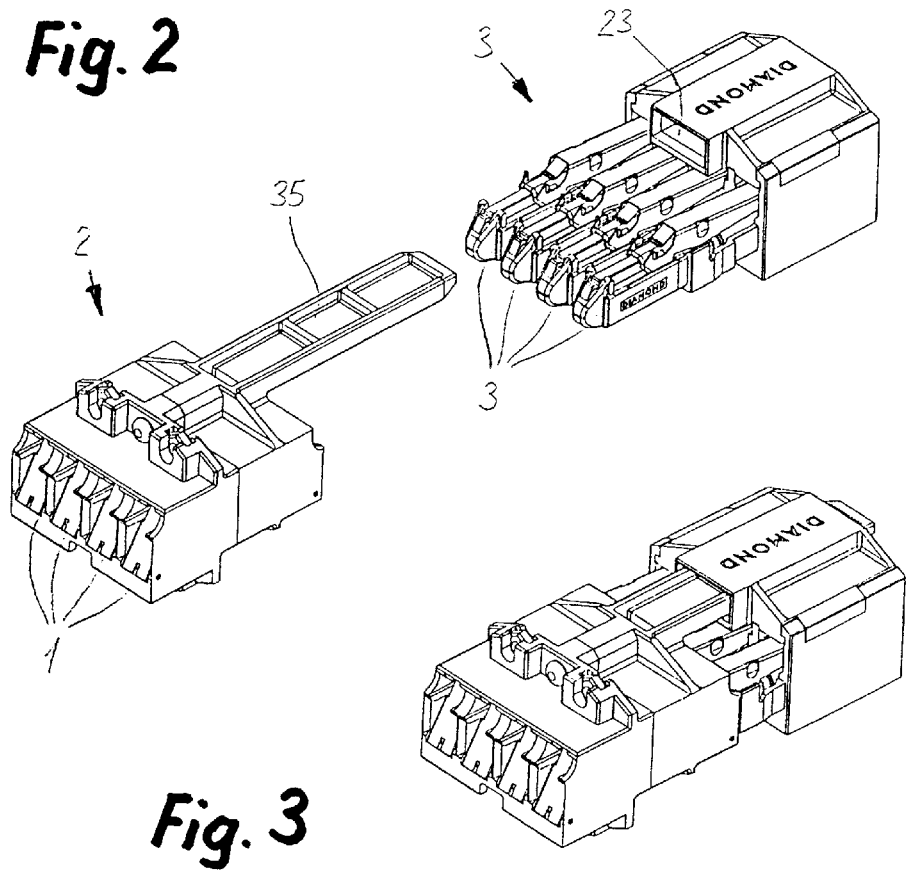
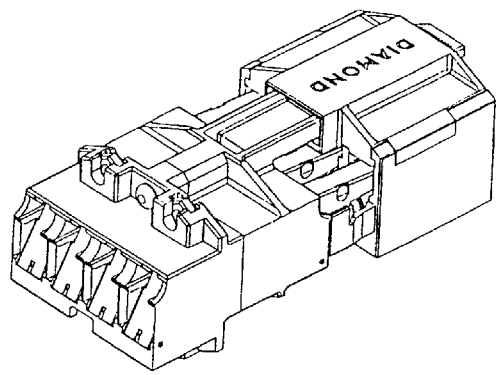
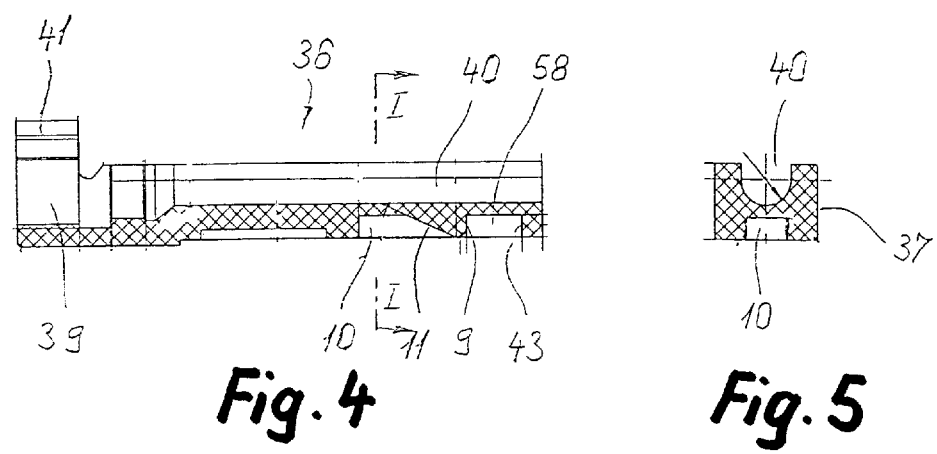

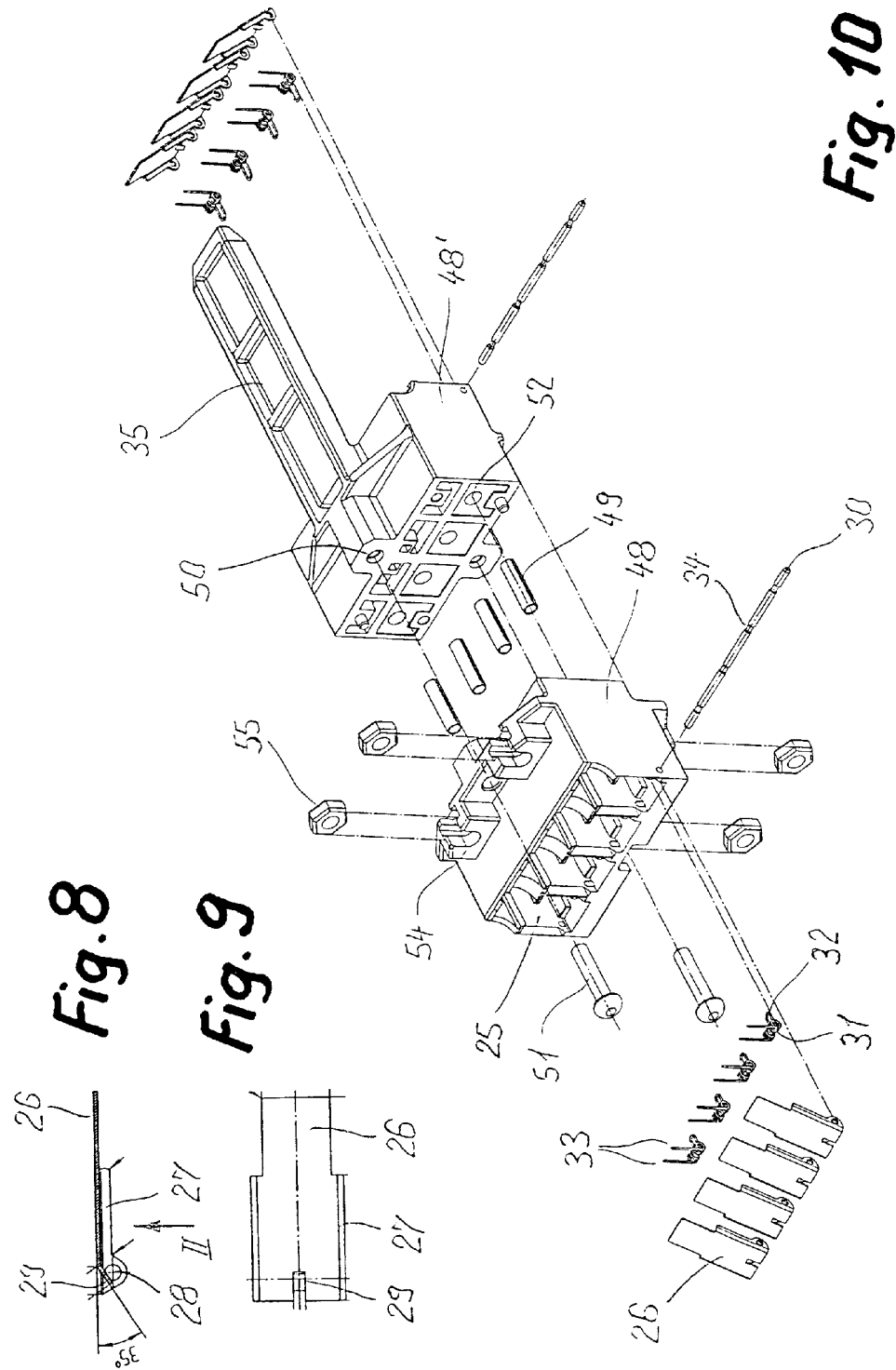

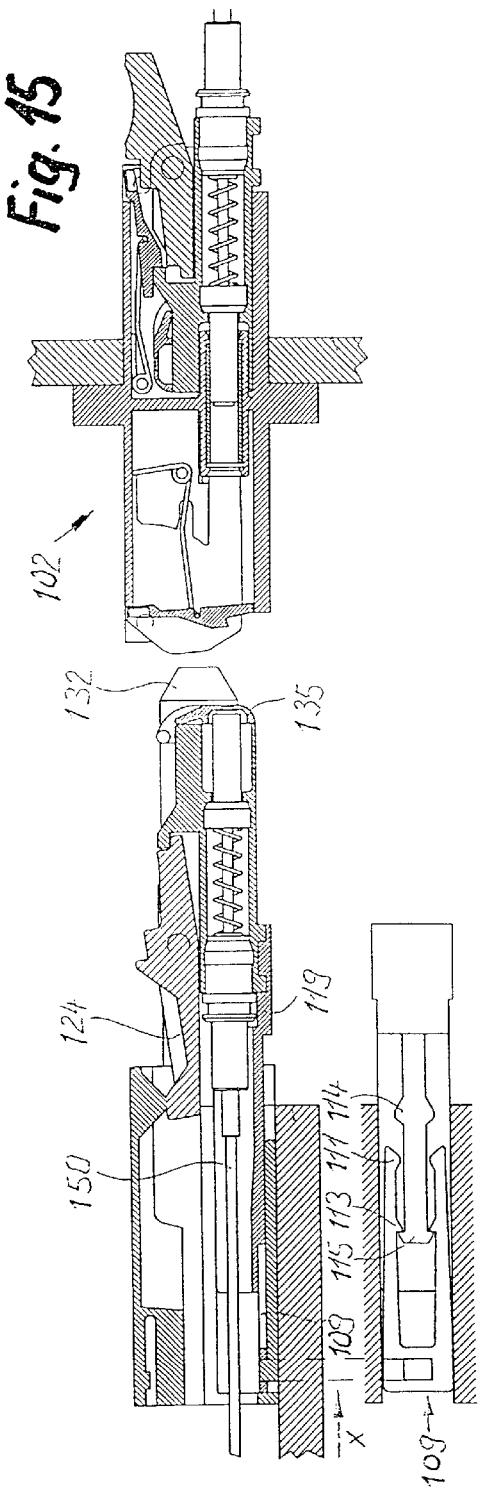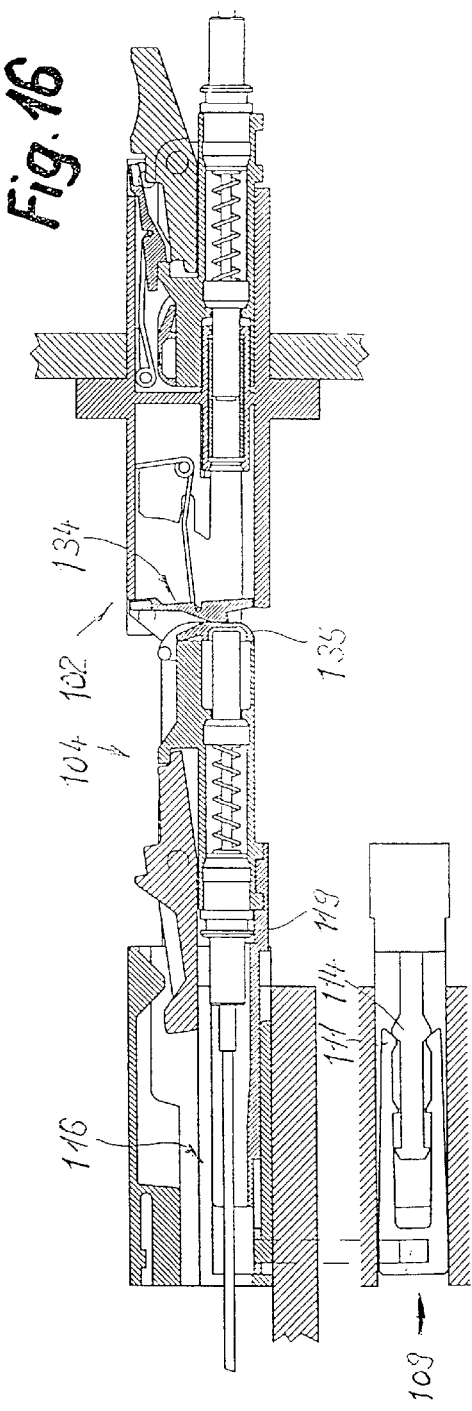

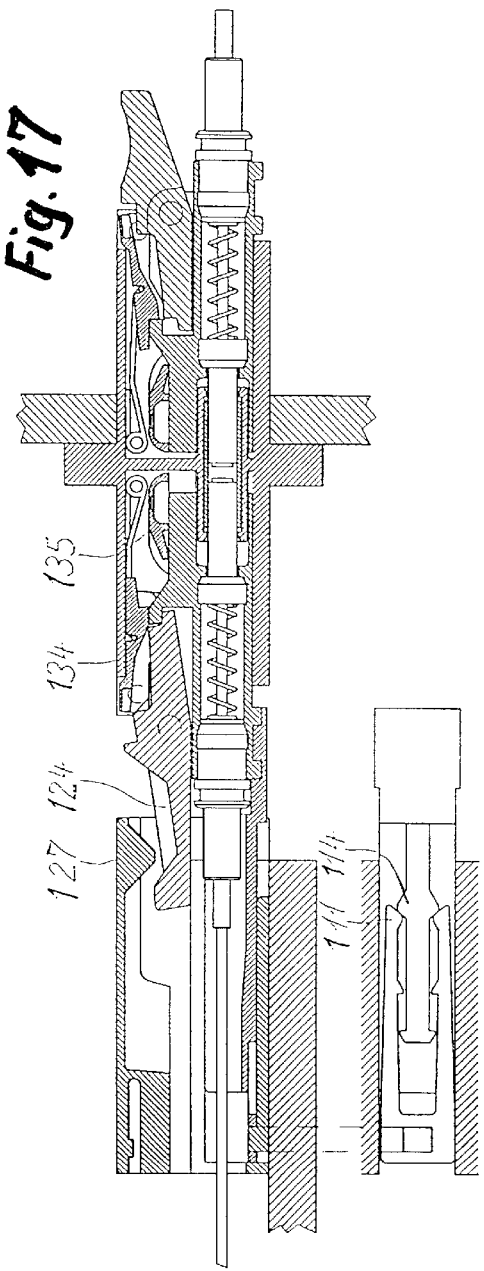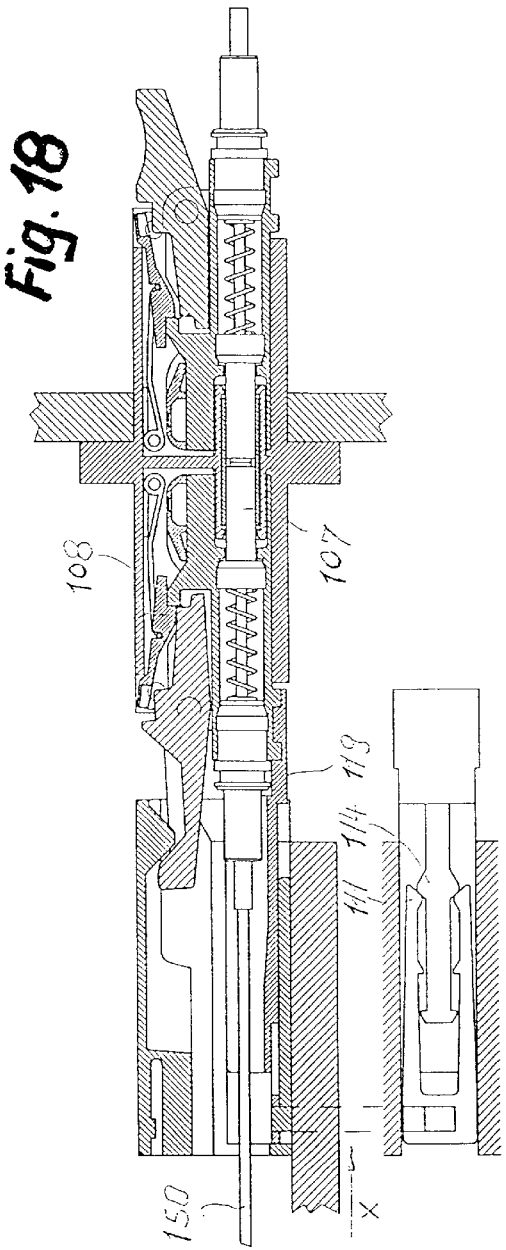

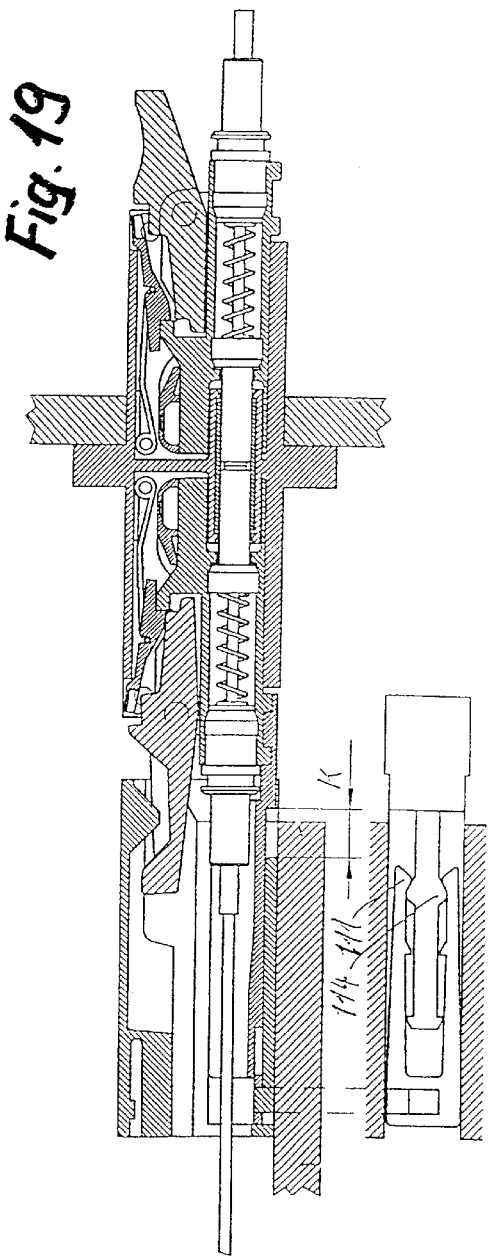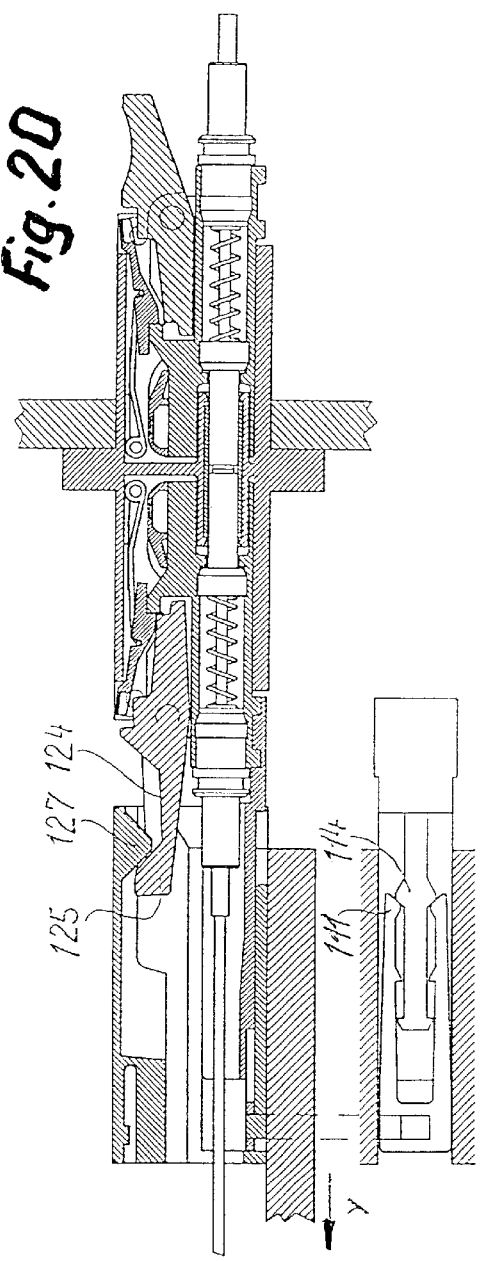

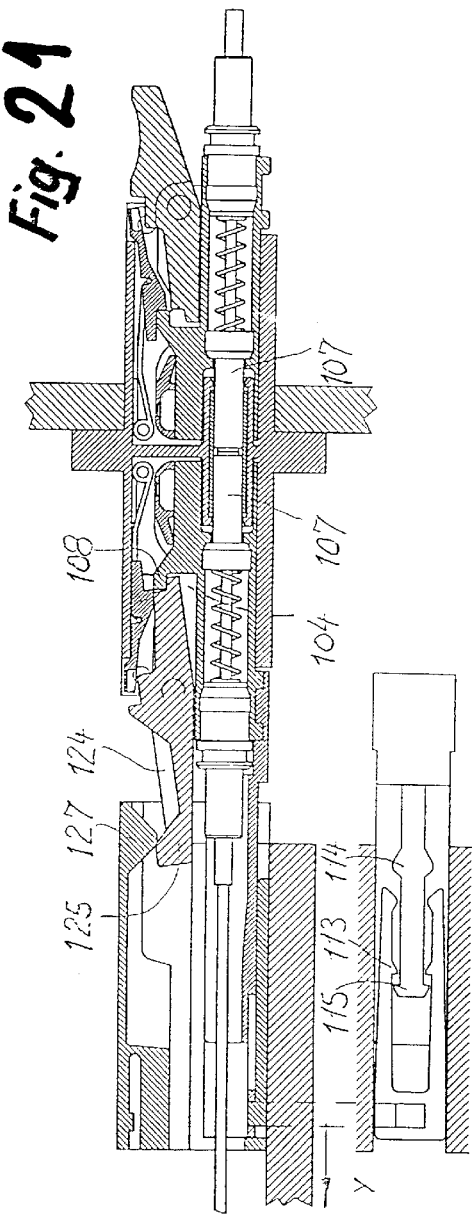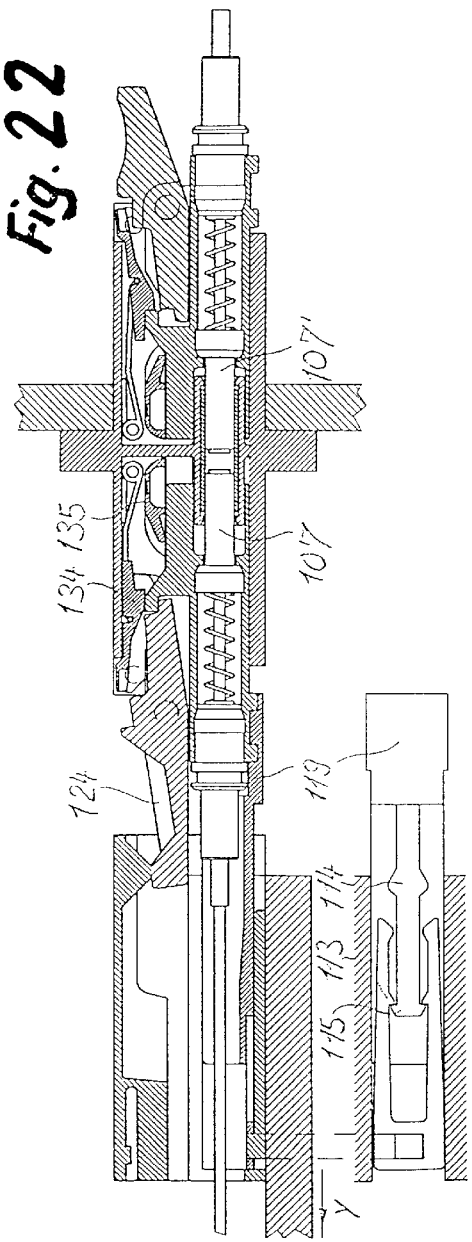

PLUG CONSTRUCTION FOR AN OPTICAL PLUG-AND-SOCKET CONNECTION

This application is a continuation-in-part of copending application Ser. No. 09/174,118, filed Oct. 19, 1998.

BACKGROUND OF THE INVENTION

The invention relates to a plug construction for an optical insert plug-and-socket connection which may be used to optically connect a daughters board to a mother board. To avoid unnecessary force transmission onto the daughter board and to compensating for mass tolerances, both boards in the connected condition are mechanically decoupled from one another.

SUMMARY OF THE INVENTION

It is therefore the object of the invention to provide a plug construction of the type mentioned above which even when significantly miniaturized ensures a reliable decoupling and which is easily assembled and simply manufactured. This object is achieved with a plug construction as described below.

We have found that with a leaf spring bent at an angle excellent results may be achieved. In particular the leaf spring permits a pivoting out downward which with regard to the lateral space requirement of the plug is not inhibiting. The leaf spring is preferably attached to the daughter board and the push abutment to the plug part. However, a kinematic reversal would also be conceivable, that is, attaching the leaf spring to the relatively displaceable plug part.

The push abutment may be formed by a material shoulder, wherein the angled part after rising over the material shoulder engages in a recess in which, in the insert direction, it can move a distance which corresponds to the maximum possible decoupling distance between the mother board and the daughter board. As the angled part dips into the recess, the leaf spring in the decoupled condition is again completely relaxed. It would, however, also be possible for the leaf spring in the decoupled condition to remain tensioned and for the angled part in this operating condition to be pressed against a surface of the plug part. The friction thus arising might be useful for braking the decoupling movement.

The material shoulder runs, preferably, roughly parallel to the angled part and roughly at a right angle to the insert direction. In spite of this construction of the material shoulder, the leaf spring with an increase of the push force is bent back because the angled part is itself subjected to bending forces. This construction of the material shoulder and the angled part has the advantage that the negotiation of the material shoulder is effected practically at a stroke, which simplifies the insert procedure. Alternatively, the angled part and/or the material shoulder could be oriented at an oblique angle to the insert direction, whereby the required push force for negotiating the material shoulder may be reduced.

The side of the recess which faces the material shoulder may be formed as a run-up ramp for the angled part on pulling back the plug from the socket part. This has the effect of reducing the necessary force for negotiating the material shoulder when the movement is reversed.

The leaf spring may be formed as a separate bent part of metal, having an anchor in the region of the fixation location. Providing a separate bent part has the advantage that the spring properties may be exactly matched to the concrete case. But it would also be possible to integrate the leaf spring directly into the daughter board or into a housing part attached to the board or into a plug housing, and to manufacture it of plastic material.

The leaf spring is advantageously held in an insert housing which forms at least one guide passage for the plug part. Further advantages may now result because the insert housing is displaceably mounted in a limited manner relative to the daughter board on a plane running roughly at right angles to the plane of the daughter board and to the insert direction. This floating mounting has the advantage that although in two spatial axes a compensation of mass inaccuracies is possible, this is not possible in the insert direction. This compensation possibility avoids a jamming of the plug parts.

The plug housings must, in the latch-in position, be held pull-proof in the socket part. This is effected by providing resilient locking elements which are arranged on the plug housing and which in the latch-in position are latchable in a detent on the socket part. To unlatch, a lifting out of the detent is necessary. With individual plug-and-socket connections this movement is carried out manually on a suitable grip piece; details may be deduced from European Patent Publication 1072920. However, with insert plug-and-socket connections with several plugs lying next to one another, this is difficult, and the unlocking movement or the force required is advantageously derived from the withdrawal movement of the plug. For this the locking element comprises a lever arm which cooperates with at least one guiding slide on the insert housing such in a way that on pulling back the plug housing, the locking is releasable. Such a controlled unlocking movement may also be realized on insert plug-and-socket connections with conventional insert elements.

The locking element may be formed as a two-arm lever which is releasably fixable on the plug housing, wherein on one lever arm there is at least one detent pawl which cooperates with the undercut and on the other lever arm there is at least one guide element which cooperates with the guiding slide. The lever releasably fixed on the plug housing has the advantage that conventional plug housings for the use in an insert plug-and-socket connection may be retrofitted.

The guiding slide may be a ramp arranged on a lateral wall of the guide passage. The ramp may run linearly or arcuately.

The guide passage may be covered with a releasable covering which comprises a centering element cooperating with a corresponding centering element on the socket part. The separate covering simplifies both the manufacture of the insert housing and the assembly of the individual plug parts in the guide passages. The construction of the centering element on the covering is above all advantageous.

The socket part has at least one socket opening which is closed by a pivotable protective flap which is linked on by a pivot pin going through the socket housing and the protective flap. Other linkage connections would of course be conceivable, but the pivot pin has the advantage that it may simultaneously accommodate a spring for biasing the protective flap toward the closure position. To fix the pivot pin laterally in the region of each protective flap, a circumferential groove is provided. A spur on the protective flap in the region of the deflection engages into this groove and thus fixes the pivot pin. This is possible because the protective flap for its part is laterally limited in the socket housing. Such a fixation of the socket flaps may also be applied to a conventional socket part for insert plug-and-socket connections or also for individual plug-and-socket connections.

BRIEF DESCRIPTION OF THE DRAWINGS

FIG. 1 is a cross section through an insert plug-and-socket connection according to the invention, FIG. 2 is a perspective representation of the socket part and plug part in the uninserted condition, FIG. 3 shows the socket part and the plug part according to FIG. 2 with the insert procedure, FIG. 4 is a longitudinal section through a carriage for accommodating a plug housing, FIG. 5 is a cross section through the plane I—I with the carriage according to FIG. 4, FIG. 8 is a longitudinal section through the protective flap, FIG. 9 is a view from the arrow direction on the protective flap according to FIG. 8, FIG. 10 is a perspective representation of a socket part before the assembly, FIGS. 15–22 show a latching sequence of a plug having the alternative latch of FIG. 14.

DESCRIPTION OF THE PREFERRED EMBODIMENT(S)

Figure 7:
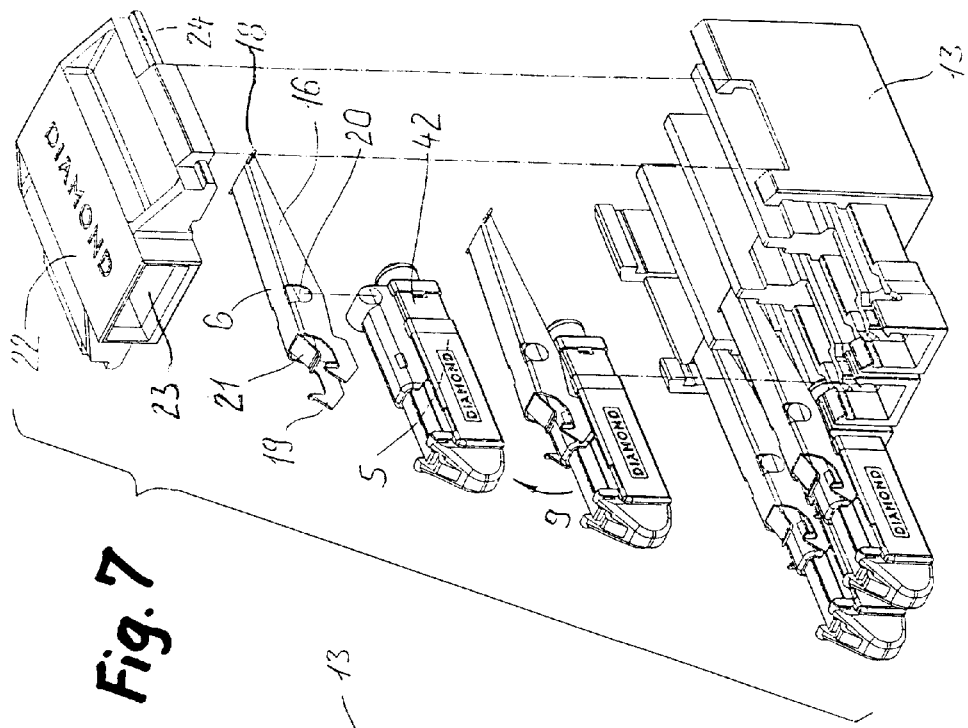
FIG. 7 shows the insert housing according to FIG. 6 equipped with plug housings and before the end assembly.

The invention is embodied in an optical connector comprising a plug 3 and a socket 1, as shown in FIG. 1. The plug construction includes an insert housing 13 which is assembled on a base part 44 on a daughter board 4 and in which several plugs 3 are axially displaceably mounted in the arrow direction a. The individual plugs 3 are fixed on a carriage 36 which is guided in the insert housing 13. To each carriage there is allocated an individual guide passage 14 which is covered to the top by a covering 22.

The plug 3 has a plug housing 5 in which a plug pin is mounted on a compression spring. To protect the plug pin, the end face of the plug housing is closed with a protective lid 56 which only with the inserting procedure is pivoted open and pushed back. For fixing the plug housing 5 in the socket part 1 a locking element in the form of a pivotable double lever 6 is fastened on the plug housing. The lever has a detent pawl 19. On reaching its latch-in position, the detent pawl 19 engages behind an undercut 15 on the plug part 1 and thus locks the plug housing 5 in the socket in a pull-proof manner. For releasing the plug, the longer lever arm is pivoted up in the arrow direction b, as described below. Further details of the plug construction may be deduced from European Patent Publication 1072920, which shows a locking element that is actuated manually. The remaining components of the plug, the plug pin and the protective lid are, however, identical.

On the base of each guide passage 14, a leaf spring 7 is fixed on one side which at its free end is provided with an angled part 8. This angled part during the insertion procedure cooperates with a push abutment 9 and during the removal procedure cooperates with a pull abutment 43 on the underside of the carriage 36. During insertion, the push force after reaching the latching position rises so much until the leaf spring 7 is displaced downward in the direction of arrow c and the angled part 8 overcomes the push abutment 9 and dips into the recess 10 lying therebehind, as seen in the direction of insertion. This recess limits a movement in the direction of arrow a to the maximum possible decoupling distance.

The socket 1 is designed as a lead-through coupling which on one side is flanged onto a mother board 2 by fastening screws 57. With the mother board it may be the case for example of a housing rear wall. Into each socket from both sides there may be inserted an identical plug 3, whose plug pins in an exactly machined centering sleeve 49 are centered to one another and pressed against one another. In certain cases it would however also be conceivable for the socket part only to be construed for the one-sided insertion of plugs and for an optical module for transmitting or receiving light to be allocated to each inserted plug.

The socket opening 25 on the insert side is closed with a pivotable protective flap 26 wherein is kept in the closure position by a spring 31. On inserting the socket part 3 the protective flap 26 is pivoted away in the direction of arrow d.

The insertion procedure between the plug and the socket is simplified by a guide arm 35 which is arranged on the socket and which engages into a centering passage 23 on the cover 22 and thus ensures a linear guiding. Otherwise, the socket part is not specially designed for the plug construction according to this invention, and may be used in combination with conventional individual plugs.

As is evident from FIGS. 2 and 3, the insert plug-and-socket connection represented in the embodiment example comprises four individual plugs and four separate sockets. But of course greater or fewer plug-and-socket connections may be manufactured in the same plug-in package. The lateral space requirement of a unit is in any case very small and is only slightly larger than the sum of the width of the individual plugs. The centering means 23 and 25 are preferably arranged roughly in the middle with respect to the width of a unit.

Figure 6:
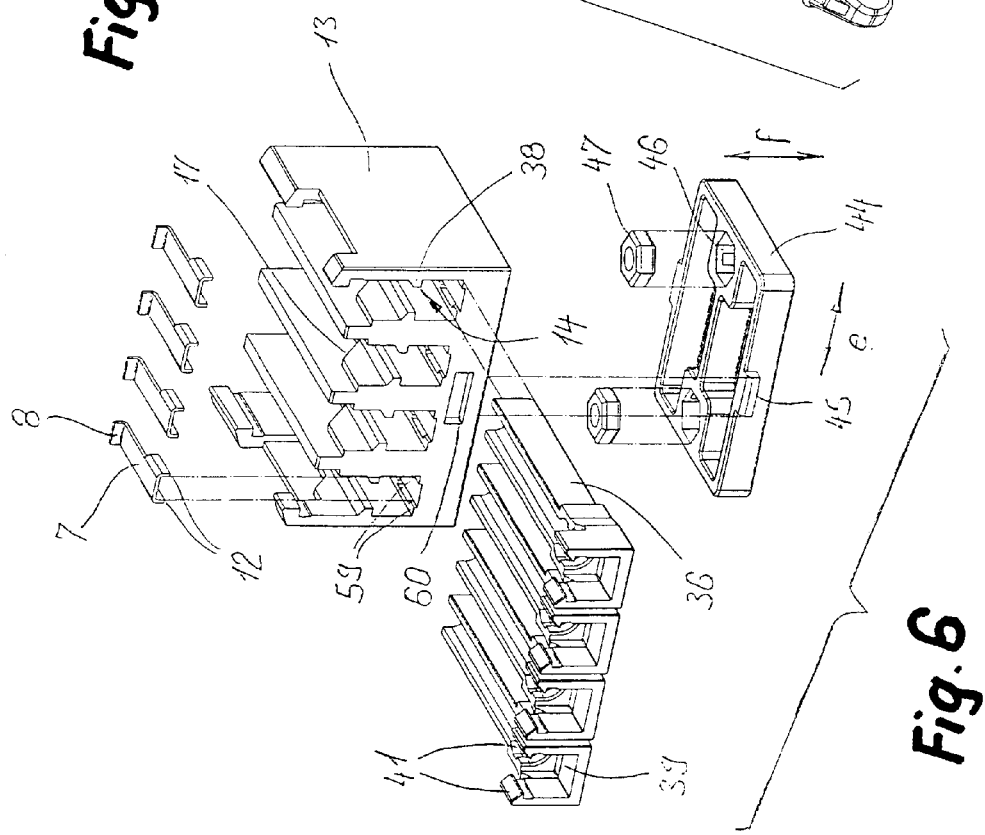
FIG. 6 is a perspective representation of an insert housing before equipping with plug housings.

FIGS. 4 to 7 show details of the insert housing 13 and the cooperation of the individual parts. The FIGS. 4 and 5 firstly show the construction of a carriage 36 whose lateral carriage runners 37 may be inserted into the individual guide passages 14, wherein the linear guiding is ensured by the carriage guides 38 on the lateral walls of the guide passages (FIG. 6). Each carriage has a roughly U-shaped step bearing 39 which may accommodate a plug housing 5 on a collar 42 (FIG. 7) specially provided therefor. For fixing the plug housing there are lateral holding claws 41. The fibre-optic cable running to each plug part rests in a likewise U-shaped cable receiver 40. On the underside of each carriage there is a material shoulder which forms the push abutment 9. Towards the recess 10, this material shoulder is formed as a run-up ramp 11 in order to permit the bending back of the angled part on the leaf spring with a low force effort. The width of the recess 10 is somewhat larger than the width of the angled part on the leaf spring. The pull abutment 43 runs roughly parallel to the push abutment 9 and limits a further recess 58 of roughly the same depth and the same width as the recess 10.

As seen in FIG. 6, the individual leaf springs 7 have lateral holding tongues 12 which engage into corresponding slots 59 on the insert housing. The leaf springs 7 are rigidly held and anchored by the inserted carriages 36 in a pull-proof manner.

On the lateral walls of the guide passages 14, linearly running ramps 17 which serve to steer the locking elements 6.

The base of the insert housing 13 is formed as a hollow base. This hollow base accommodates the base part 44, which on two longitudinal sides is in each case provided with a snap lug 45. The snap lugs latch into corresponding openings 60 in the hollow base and specifically in a manner such that the base part 44 is held with play laterally in the direction of arrow e as well as in the direction of arrow f. This produces a floating mounting of the insert housing 13 on the daughter board 4. The base part 44 itself is rigidly connected to the daughter board by means of screw nuts 47 which rest in seats 46. With the help of fastening screws (FIG. 1) the base part 44 may be screwed on the daughter board 4.

As shown in FIG. 7, conventional plug housings 5 are equipped with locking elements 6 specially designed for the insert plug connection. These are designed as two-armed levers which may be snapped into linkage openings 20 on the plug housing. At the end of the longer lever arm 16 there are guide elements 18 which project laterally and cooperate with the ramps 17 in the insert housing 13. The detent pawls 19 are arranged at the end of the shorter lever arm. A spring 21 in the assembled condition is supported on the upper side of the plug housing so as to bias the detent pawls 19 in the latching direction g.

After all carriages 36 are equipped with a plug housing 5, the insert housing 13 may be closed with the cover 22. This is effected in turn via snap connections with the help of the latching strips 24.

Further details of the socket are shown in FIG. 10. The socket consists of the two housing halves 48 and 48' which after the placing of the centering sleeves 49 into the sleeve bearings 52 (see also FIG. 1) are joined together. For this there are connection bolts 51 which are snapped and/or adhered into bolt holes 50.

On the housing half 48 again there are integrated nut seats 54 which accommodate nuts 55. These serve, as mentioned above, for fastening of the socket housing 48, 48' on the mother board 2.

Each socket opening 25 is closed with a protective flap 26 as shown in FIGS. 8 and 9. On the bent up lateral limbs 27 there are openings 28 for the linkage on the socket housing. Out of the plane of the protective flap 26 in the region of these linkage locations there is bent up in each case a spur 29. The protective flaps are linked by a common bearing pivot pin 30 which goes through the openings 28 as well as through the individual coiled torsion springs 31, each of which has a support foot 32 that bears against the base of the socket housing. The spring limbs 33 lie on the protective flap 26 and press it toward the closure position. The spur 29 of each protective flap 26 snaps into a circumferential groove 34 on the bearing axis 30 and thus fixes it in the lateral position.

Figure 11:
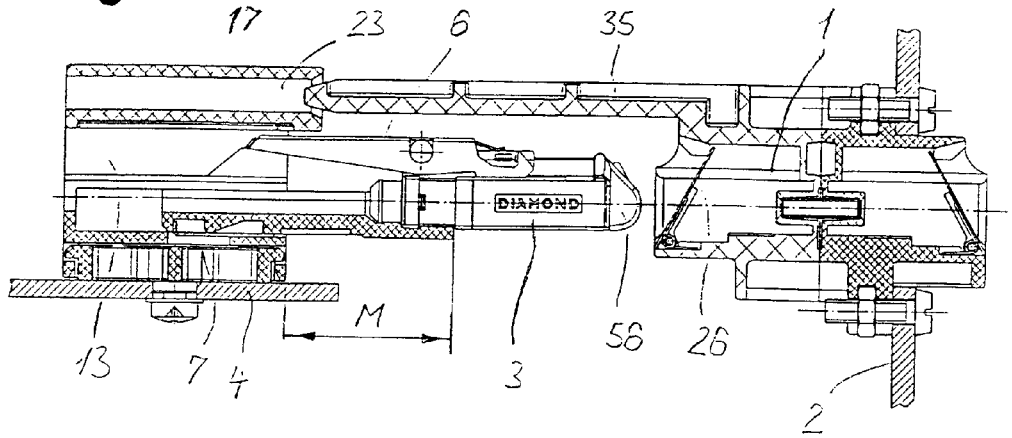
FIGS. 11 to 13 show various sequences on manufacturing an insert plug-and-socket connection.
Figure 12:
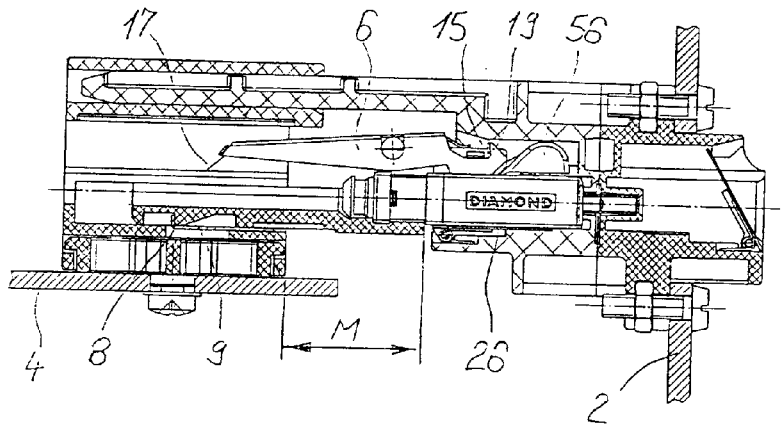
Figure 13:
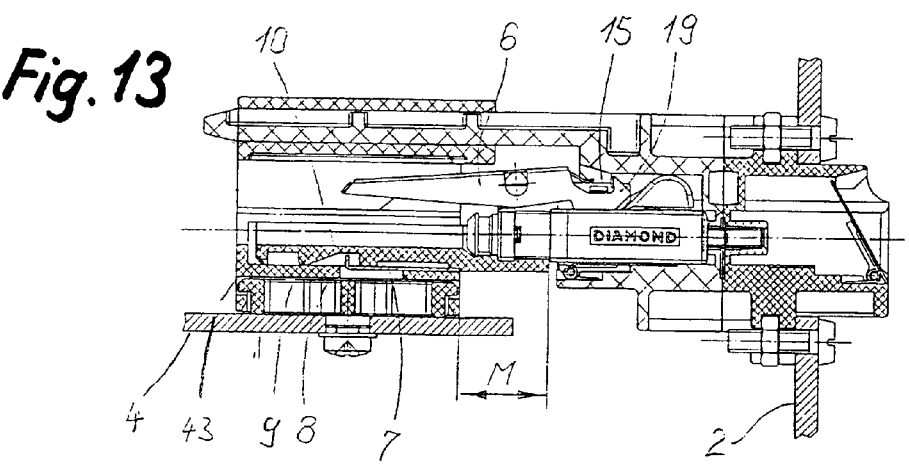
Figure 14:
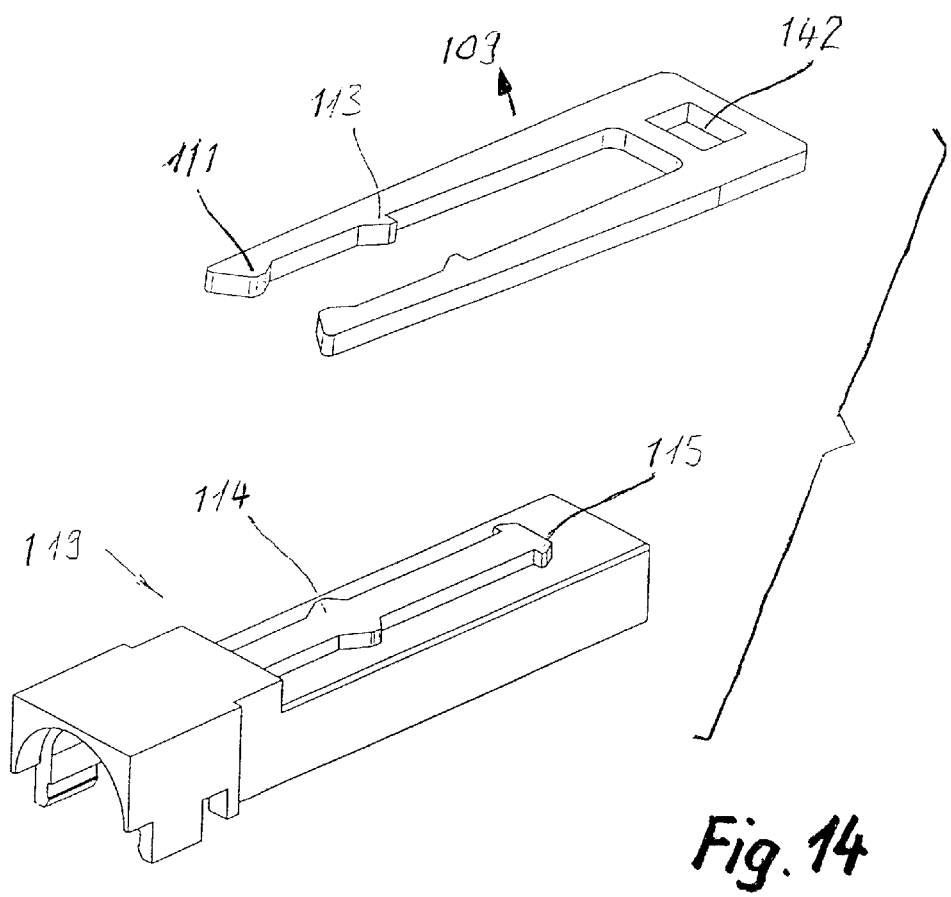
FIG. 14 shows an alternative form of a portion of the invention.

The movement sequences of an insert procedure are explained with reference to FIGS. 11–13. In the position according to FIG. 11, the components are aligned with one another so that the guide arm 35 already engages into the centering passage 23. The plug part 3 has been extended out relative to the insert housing 13 by the maximum measure M. The protective flap 26 on the socket part as well as the protective lid 56 on the plug part are located in the closure position. The locking element 6 on the ramp 17 is biased into the unlocking position.

With a further advance of the daughter board 4 against the mother board 2 (FIG. 12), the plug part 3 supported on the push abutment 9 and on the angled part 8 of the leaf spring 7 is introduced into the socket part 1. Simultaneously, the protective flap 26 is pressed down and the protective lid 56 in a known manner is pivoted over a guide (not represented in detail) and is displaced back relative to the end-face of the plug. The measure M of the outward movement is at the same time reduced by the lost motion between the push abutment 9 and the pull abutment 43. At the same time the ramp 17 releases the locking element 6 to the extent that upon reaching the latching position, the detent pawls 19 may latch on the undercut 15. Roughly simultaneously, or directly after reaching the latching position, a further rise in the push force effects a release of the angled part 8 from the push abutment 9 by way of the back-yielding of the leaf springs 7 into a free space provided therefore. Directly after negotiating the push abutment 9, the angled part dips into the recess 10 whereby the measure M of outward movement is further reduced. In this recess, the insert housing 13 and thus the whole daughter board is completely decoupled from the plug 3 and thus from the mother board 2. The biasing force of the plug pins pressed against one another is thus completely taken up by the locking on the socket housing and may not be transmitted onto the daughter board.

To release the insert plug connection, the angled part 8 must again negotiate the material shoulder of the push abutment 9 in the reverse direction. With a continuation of the pulling movement, the ramp 17 steers the locking element 6 in a manner such that the locking on the socket is released and the plug may be pulled out of the socket. The pulling force is transmitted by way of the angled part on the leaf spring via the pull abutment 43 to the plug.

FIGS. 14–22 show an alternative form of the invention, wherein the resilient element is not a leaf spring moving in a vertical plane, but rather a U-shaped clip or fork (FIG. 14) having parallel prongs 109 in a horizontal plane. The boss 142 on the bridging end of the fork secures the fork to the insert housing. The prongs can be pressed together or apart temporarily, but they return to parallel because of their resiliency. The prongs move laterally, in the direction of neighboring plug portions in a multi-plug connector. Where the plug density is high, it may be preferred to use the leaf-spring embodiment described above, because of lateral clearance limitations.

In this embodiment, the design of the abutment is correspondingly modified. The vertically projecting abutment of the prior embodiment is replaced by a structure on the insert housing having horizontally varying width. The mechanical thrust stop is pinched by the ends of the fork prongs, and provides resistance which must be overcome by applying enough force—more than the force required to seat the plug portion in the socket—to the insert housing.

The sequence of operation of this embodiment is illustrated in FIGS. 15–22. In FIG. 15, the insertion guide arms 132 have not yet reached their guide openings on the mother board. The carriages 119 are fully extended and the release lever 124 is still depressed in the release position.

In FIG. 16, the protective cap 135 bears against the protective flap 134 on the sleeve portion 102. By means of the ensuing resistance, the carriage 119 is inserted into the insert-rack housing 116 until the mechanical thrust stop 114 makes contact on the thrust lug 111 of the fork 109. Each subsequent thrust movement in the direction of the arrow X now ensues against the spring force of the fork 109. The spring force is, however, sufficient to overcome friction when the plug portion 104 enters the sleeve portion 102.

In FIG. 17, the plug portion 104 is almost fully engaged in the sleeve portion 102. The protective flap 134 has been pivoted inward and the protective cap 135 has been pivoted up through 90° and retracted to the rear. The release lever 124 has been freed and is no longer fixed in the release position by the control lug 127. The thrust lugs 111 remain in contact with the mechanical thrust stop 114.

In FIG. 18, the plug is fully seated. The locking latch 23 has now engaged behind the locking tab 8 so that the plug ferrule 7 is held against its axial preloaded spring tension in the sleeve 155 and is pressed at its face against the plug ferrule 107'. The plug can no longer be release by pulling on the cable 150. The thrust lugs 111 of the fork 109 still make contact with the mechanical thrust stop 114. Because the carriage cannot be move further toward the motherboard 3, any further movement in the direction of the arrow X will cause splaying of the fork prongs.

In FIG. 19, the thrust lugs 111 have overrun the mechanical thrust stop 114 because of the splaying action. The daughter board 5 is now, from the force point of view, decoupled from the motherboard 3 and can move a limited distance further toward the motherboard. The maximum possible axial compensation K enables compensation of tolerance buildup and fitting of the daughter board within the housing free of strain.

FIGS. 20–22 show the withdrawing sequence. In FIG. 20, the mechanical thrust stop 114 is once again overrun in the opposite direction by the opposed thrust lugs 111. The plug portion remains, however, in the locked position, inserted and unchanged, until the control lug 127 contacts the guide cam 125 and the release lever 124.

In FIG. 21, further withdrawing movement has caused, first, a depression of the release lever 124, the locking latch being raised from behind the locking tab 108. Only at this point can the plug portion 104 be withdrawn from the sleeve portion 102.

In FIG. 22, the release lever 124 has reached its final release position, and the locking-latch teeth 113 contact the mechanical pull stop 115. The carriage 119 has now reached its maximum extended position and the pulling force is transmitted directly to the carriage via the mechanical pull stop 115. If withdrawal of the plug portion from the sleeve portion is initiated now, the protective flap 134 will close automatically, and the protective cap 135 will also be closed by means not shown here.

Inasmuch as the invention is subject to variations and modifications, it is intended that the foregoing shall be interpreted only as illustrative of the invention defined by the claims that follow.

I claim:

1. An optical connector comprising
   a socket part adapted for mounting on a mother board,
   a plug part adapted for mounting on a daughter board,
   said plug part comprising a plug housing adapted to be received in said socket part when moved in an insertion direction toward a latching position,
   a resilient element for supporting the plug housing on the daughter board, which after reaching the latching position, is decoupled from the mother board by supporting the plug housing on a resilient element, said element providing a spring force which maintains the support until the latching position is reached and then automatically disengages when the plug part is moved further in the insertion direction,
   said resilient element being a leaf spring, extending in said insertion direction, and having a fixed end and a free end having an angled part, said angled part cooperating with an abutment in such a way that, after reaching a predetermined pushing force, the angled part overrides the abutment by a swinging out movement of the leaf spring.

2. The invention of claim 1, wherein the abutment is formed by a material shoulder, and the angled part after negotiating the material shoulder engages into a recess in which it can be displaced in the insert direction a distance corresponding to a maximum possible decoupling path.

3. The invention of claim 2, wherein the material shoulder runs roughly parallel to the angled part and roughly at right angles to the insert direction, and a side of the recess facing the material shoulder is designed as a run-up ramp for the angled part when the plug part is being pulled out of the socket part.

4. The invention of claim 1, wherein the resilient element is a U-shaped fork having a pair of prongs, the prongs having opposed lugs with a space between the lugs, and the abutment has a width greater than that of said space, so that sufficient pushing force must be applied to spread the prongs apart to permit the abutment to pass between the lugs.

5. The invention of claim 1, wherein the resilient element is disposed on the daughter board and the abutment is disposed on the plug part.

6. The invention of claim 1, wherein the resilient element is a separate bent piece of metal and includes anchoring means for anchoring the resilient element at a fixing location.

7. The invention of claim 1, further comprising an insert housing providing at least one guide passage for the plug part, said resilient element being held in said insert housing.

8. The invention of claim 7, wherein the insert housing is displaceably mounted in a limited manner on a daughter board on a plane which runs roughly perpendicular to the plane of the daughter board and perpendicular to the insert direction.

9. The invention of claim 1, wherein the resilient element, in its latching position, latches into an undercut on the socket part, and the locking element comprises a lever arm which cooperates with at least one guiding slide on the insert housing in a manner such that on pulling back the plug housing the locking element is released.

10. The invention of claim 9, wherein the locking element is a lever releasably fixable on the plug housing, said lever having two arms, wherein one lever arm has a detent pawl for engaging the undercut, and the other lever arm has at least one guide element which cooperates with the guiding slide.

11. The invention of claim 9, wherein the guiding slide is a ramp arranged on a lateral wall of the guide passage.

12. The invention of claim 9, wherein the guiding slide is covered by a releasable cover comprising a centering element which cooperates with a corresponding centering element on the socket part.

13. The invention of claim 1, comprising at least two plug parts and at least two corresponding socket parts arranged in a common socket housing.

* * * * *